(12) United States Patent
Sano (10) Patent No.: US 9,195,422 B2
(45) Date of Patent: Nov. 24, 2015

(54) IMAGE FORMING APPARATUS AND METHOD OF CONTROLLING THE APPARATUS

(75) Inventor: Jumpei Sano, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 745 days.

(21) Appl. No.: 12/831,068

(22) Filed: Jul. 6, 2010

(65) Prior Publication Data

US 2011/0037999 A1 Feb. 17, 2011

(30) Foreign Application Priority Data

Aug. 11, 2009 (JP) ................................. 2009-186777

(51) Int. Cl.
G06F 3/12 (2006.01)
G03G 15/00 (2006.01)

(52) U.S. Cl.
CPC ............ *G06F 3/126* (2013.01); *G03G 15/5012* (2013.01); *G06F 3/1221* (2013.01); *Y02B 60/1271* (2013.01)

(58) Field of Classification Search
None
See application file for complete search history.

(56) References Cited

U.S. PATENT DOCUMENTS

| | | | |
|---|---|---|---|
| 7,020,403 B2* | 3/2006 | Nomura ............................ 399/8 |
| 7,072,066 B2* | 7/2006 | Guddanti ...................... 358/1.15 |
| 7,685,240 B2* | 3/2010 | Tonegawa et al. ............ 709/206 |
| 7,742,179 B2* | 6/2010 | Ikeda ............................ 358/1.14 |
| 7,787,796 B2* | 8/2010 | Nosaki ............................. 399/88 |
| 7,966,415 B2* | 6/2011 | Shouno .......................... 709/232 |
| 8,281,159 B1* | 10/2012 | Cooley et al. .................. 713/300 |
| 8,289,544 B2* | 10/2012 | Yamada ....................... 358/1.15 |
| 8,363,240 B2* | 1/2013 | Koike .......................... 358/1.14 |
| 2004/0057069 A1* | 3/2004 | Ikeda .......................... 358/1.14 |
| 2004/0095599 A1* | 5/2004 | Guddanti ..................... 358/1.15 |
| 2006/0262340 A1* | 11/2006 | Lee .............................. 358/1.14 |
| 2008/0068650 A1* | 3/2008 | Negoro ........................ 358/1.15 |
| 2008/0158596 A1* | 7/2008 | Kadota ........................ 358/1.15 |
| 2008/0174819 A1* | 7/2008 | Hada ........................... 358/1.15 |
| 2008/0180743 A1* | 7/2008 | Uruta et al. .................. 358/1.15 |
| 2008/0304099 A1* | 12/2008 | Yamada ....................... 358/1.15 |
| 2008/0316532 A1* | 12/2008 | Fukuda ....................... 358/1.15 |
| 2009/0021786 A1* | 1/2009 | Kaneko ....................... 358/1.15 |
| 2009/0262395 A1* | 10/2009 | Kanamoto ................... 358/1.15 |
| 2012/0128385 A1* | 5/2012 | Song et al. ..................... 399/88 |

FOREIGN PATENT DOCUMENTS

JP 2002185659 A 6/2002

* cited by examiner

*Primary Examiner* — Marcus T Riley
(74) *Attorney, Agent, or Firm* — Fitzpatrick, Cella, Harper & Scinto

(57) ABSTRACT

The invention relates to an image forming apparatus having a hibernation function and a control method of the apparatus. When a transition to hibernation is instructed, it is determined whether or not a job is ongoing, and if it is determined that a job is ongoing, a job suspension request for suspending the ongoing job is issued. As a result, a job execution unit prohibits a new job input in response to the job suspension request, and if the ongoing job involves data reception from an external apparatus, the job execution unit awaits for completion of the data reception and returns the response. In accordance with the response, a pre-processing sequence to be executed at the time of return from the hibernation is generated, and hibernation processing is performed.

11 Claims, 10 Drawing Sheets

IMAGE FORMING APPARATUS AND METHOD OF CONTROLLING THE APPARATUS

BACKGROUND OF THE INVENTION

1. Field of the Invention

The present invention relates to an image forming apparatus having a hibernation function and a controlling method of the apparatus.

2. Description of the Related Art

As image forming apparatuses in recent years have multiplied their functions, the volume of softwares for controlling these functions is increasing. As a result, there is an aggravating problem of long start-up time in power-on operation. For solving this problem, hibernation is known. Hibernation is a technique for storing, in a hard disk, the state of an apparatus immediately before power-off, and restoring the stored state of the apparatus in the RAM at a next power-on timing, so as to regain the state of the apparatus as it was before the power-off and expedite the start-up operation of programs including an OS (see Japanese Patent Laid-Open No. 2002-185659).

However, in a multifunction apparatus shared by plural users, there are various users and jobs of various sizes for copying, printing, faxing and so on. If the completions of jobs are awaited before hibernating the apparatus, the transition to hibernation takes long time. On the other hand, if the apparatus makes a transition to hibernation before jobs are completed, the jobs are suspended (canceled), causing a problem in the form of job loss along the way.

SUMMARY OF THE INVENTION

An aspect of the present invention is to eliminate the above-mentioned problems with the conventional technology.

Further, an aspect of the present invention is to provide a technique that enables an image forming apparatus to save time in a transition to hibernation, and to resume suspended jobs with no loss of jobs after the apparatus returns from hibernation.

According to an aspect of the present invention, there is provided an image forming apparatus comprising: a job execution unit configured to execute a job that involves image formation; a determination unit configured to, when a transition to hibernation is instructed, determine whether or not the job execution unit is executing an ongoing job; an issuance unit configured to, if the determination unit determines that the job execution unit is executing the ongoing job, issue a job suspension request that makes the job execution unit suspend the ongoing job; and a hibernation control unit configured to, in accordance with a response from the job execution unit in reply to the request of the issuance unit, generate a pre-processing sequence to be executed at the time of return from the hibernation, and execute hibernation processing, wherein the job execution unit prohibits a new job input in accordance with the job suspension request, and if the ongoing job involves data reception from an external apparatus, the job execution unit awaits for completion of the data reception and returns the response.

According to another aspect of the present invention, there is provided a method of controlling an image forming apparatus, comprising: a job execution step of executing a job which involves image formation; a determination step of, when a transition to hibernation is instructed, determining by a determination unit whether or not the job execution step is ongoing; an issuance step of, if it is determined in the determination step that a job is ongoing, issuing a job suspension request which makes the ongoing job suspended; and a hibernation control step of, in accordance with a response to the job suspension request, generating a pre-processing sequence to be executed at the time of return from the hibernation, and executing hibernation processing, wherein in the job execution step, a new job input is prohibited in accordance with the job suspension request, and if the ongoing job involves data reception from an external apparatus, completion of the data reception is awaited and the response is returned.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described hereinafter in detail with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
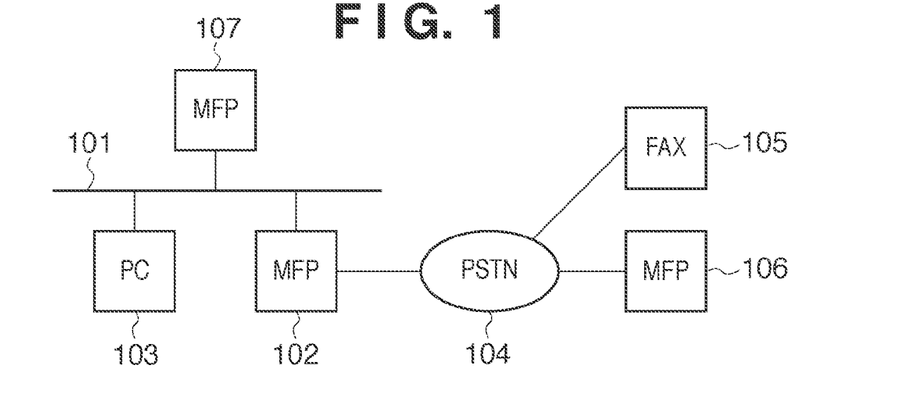
FIG. 1 is a typical diagram illustrating a network configuration including a multi-function peripheral (MFP) according to an embodiment of the present invention.

FIG. 1 is a typical diagram of a network configuration including a multi-function peripheral (MFP: an image forming apparatus) according to an embodiment of the present invention.

An MFP 102 is a stand-alone apparatus which can realize multiple functions, such as image scanning, printing, copying, faxing and the like. The image scanning function according to the present embodiment is scanning a printed material by, for example, image sensors arranged in line, and inputting an image of the printed material as image data. It also includes a function for transmitting the image data, obtained by scanning, to another apparatus through a network 101. A PC 103 is a personal computer which is capable of displaying and editing various data and generating print data and so on, with the use of various application programs. The MFP 102, which is connected to the network 101, can mutually transmit or receive various data and information, such as print jobs, image data and the like, to or from another MFP 107 or PC 103 through the network 101. An IP network, such as a LAN or WAN, may be used as the network 101. Also, the MFP 102 is connected to a Public Switched Telephone Network (PSTN) 104 via a communication MODEM. Through the PSTN 104, the MFP 102 is connected to an MFP 106 and a FAX machine 105 for FAX transmission and reception.

Figure 2:
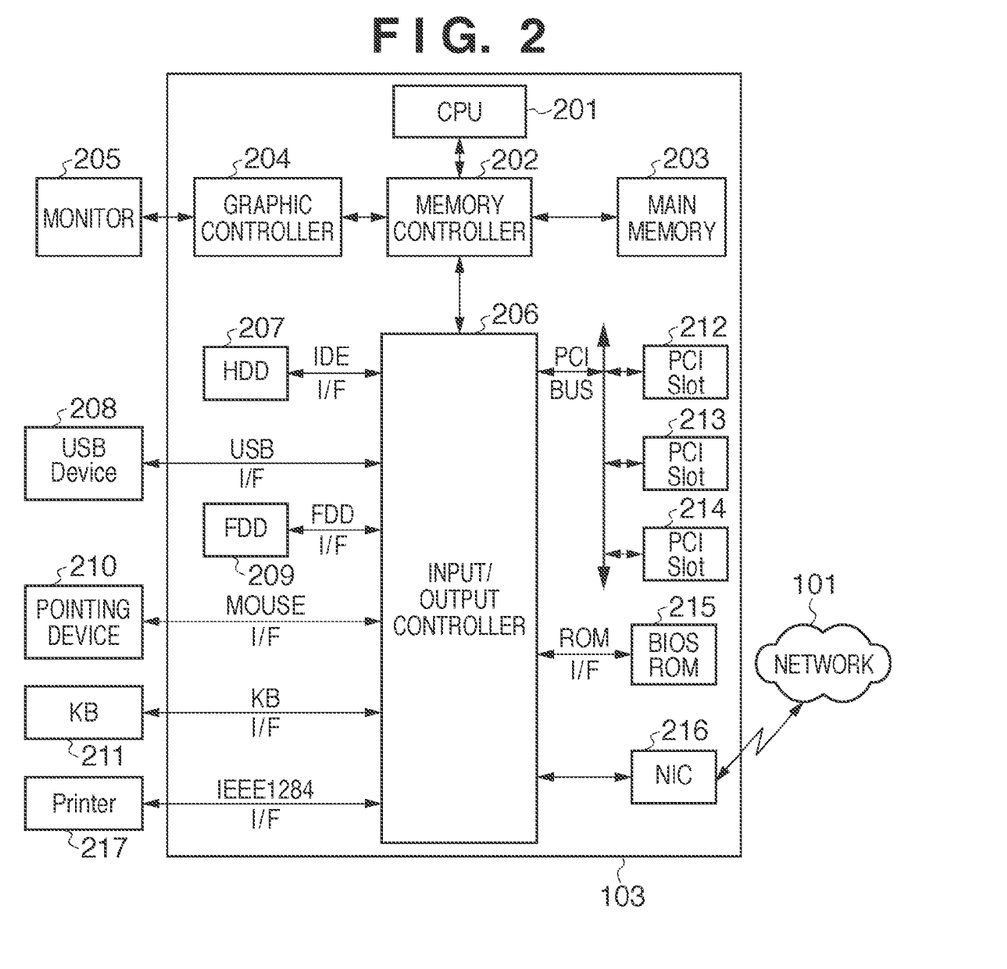
FIG. 2 is a block diagram describing a PC configuration according to the embodiment.

FIG. 2 is a block diagram describing a configuration of the PC 103 according to the present embodiment.

A CPU 201 performs overall control of the PC 103 in accordance with a program stored in a BIOS ROM 215 which will be described later or a program loaded from a HDD 207 to a main memory 203. A memory controller 202 performs read/write control of the main memory 203, read/write control of a graphic controller 204, and read/write control of an input/output controller 206. When a program stored in the HDD 207 is executed, the main memory 203 retains the program, serves as a working area in the program operation, and stores control-target data and output data. The graphic controller 204, which is used as a user interface, displays texts, graphics, and the like on a monitor 205 for providing information necessary for the user. The graphic controller 204 has an internal graphic memory (not shown) for storing display-target data so that the graphic controller 204 can arbitrarily read the data out of the memory. The monitor 205 displays texts, graphics, images, moving images and so on in accordance with the control of the graphic controller 204. The input/output controller 206 has the following main functions.

(1) read/write control of the HDD 207
(2) read/write control of a USB device 208
(3) read/write control of an FDD 209
(4) input control of a pointing device 210
(5) input control of a keyboard (KB) 211
(6) input/output control of a printer 217
(7) control of PCI BUS connecting PCI slots 212 to 214
(8) read control of a BIOS ROM 215
(9) execution of control protocol for physical interface with the network 101 and Internet connection The hard disk drive HDD 207 is connected to the input/output controller 206 by an IDE interface. The programs installed in the HDD 207 include the following.

(1) an operating system (OS) for performing overall basic control
(2) an application program for performing high-level data processing
(3) a driver program (data necessary for execution of these programs or user-generated data) for controlling an input/output device, for example, the printer 217

The USB device 208 is a generic term of an input/output device that can be connected through a USB interface. A user can use USB devices by connecting an input/output device to a USB interface as necessary. These USB devices include a keyboard, a pointing device, an image reader, a digital camera, a film scanner, a printer, a CDR, a ROM drive, a DVD drive, an extended HDD, an IC card, and the like. A NIC 216 executes control protocols for physical interface with the network 101 and Internet connection.

Figure 3:
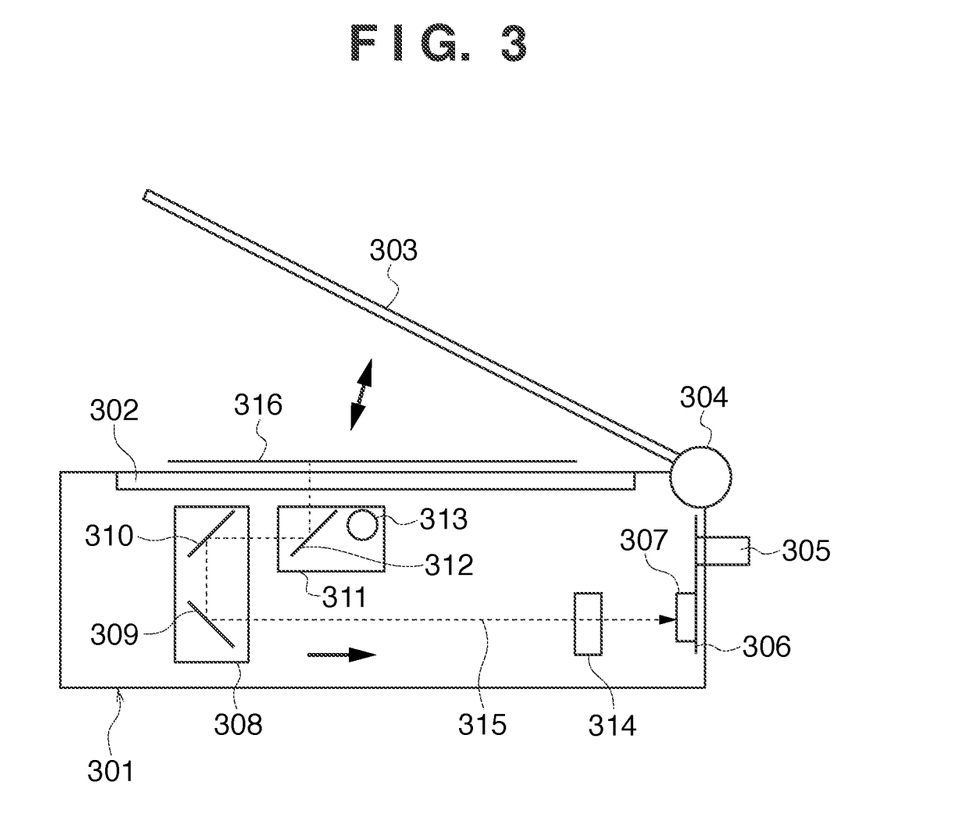
FIG. 3 is a typical diagram of a reader unit (scanner unit) of the MFP according to the embodiment.

FIG. 3 is a typical diagram of a reader unit (scanner unit) of the MFP according to the present embodiment.

A reader unit 301 comprises, on its upper part, a platen glass 302 made of a transparent material, such as glass, and a document presser 303 for pressing an original document 316 placed its image side down on the platen glass 302. The document presser 303, which is movable by a hinge 304 but unseparable from the reader unit 301, is configured to press the original document 316 placed on the platen glass 302. Although FIG. 3 shows as if the original document 316 were floating over the platen glass 302, in reality it is in close contact with the platen glass 302. A light emitted from a light source 313 is reflected by an image on the surface of the original document 316 placed on the platen glass 302 and the reflected light is then reflected by reflection mirrors 309, 310, and 312, and transmitted to a CCD 307 in accordance with the course shown by an optical path 315. A lens 314 forms an image of the original document's surface on the CCD 307. The CCD 307 can read an image corresponding to one line at a time. The image received by the CCD 307 is converted to digital data by an image processing unit provided on a circuit board 306, and transmitted to an apparatus, such as a printer, which is connected to an interface connector 305.

The reflection mirrors 309 and 310 are connected to a driving motor (not shown) through gears, and fixed to a first movable unit 308 which is configured to be linearly movable in a sub-scanning direction of the original document 316. The reflection mirror 312 is fixed to a second movable unit 311 together with the light source 313, for instance, xenon lamp. The second movable unit 311 is also connected to the aforementioned driving motor through another gear, and as similar to the first movable unit 308, configured to be linearly movable in the sub-scanning direction. The traveling speed of the first movable unit 308 is set half the traveling speed of the second movable unit 311 by an appropriate gear construction so that the optical path 315 maintains a constant distance. The first and second movable units 308 and 311 both move after a line in the main-scanning direction is read, and by reading consecutive lines one after another, a sheet of original document is read.

Figure 4:
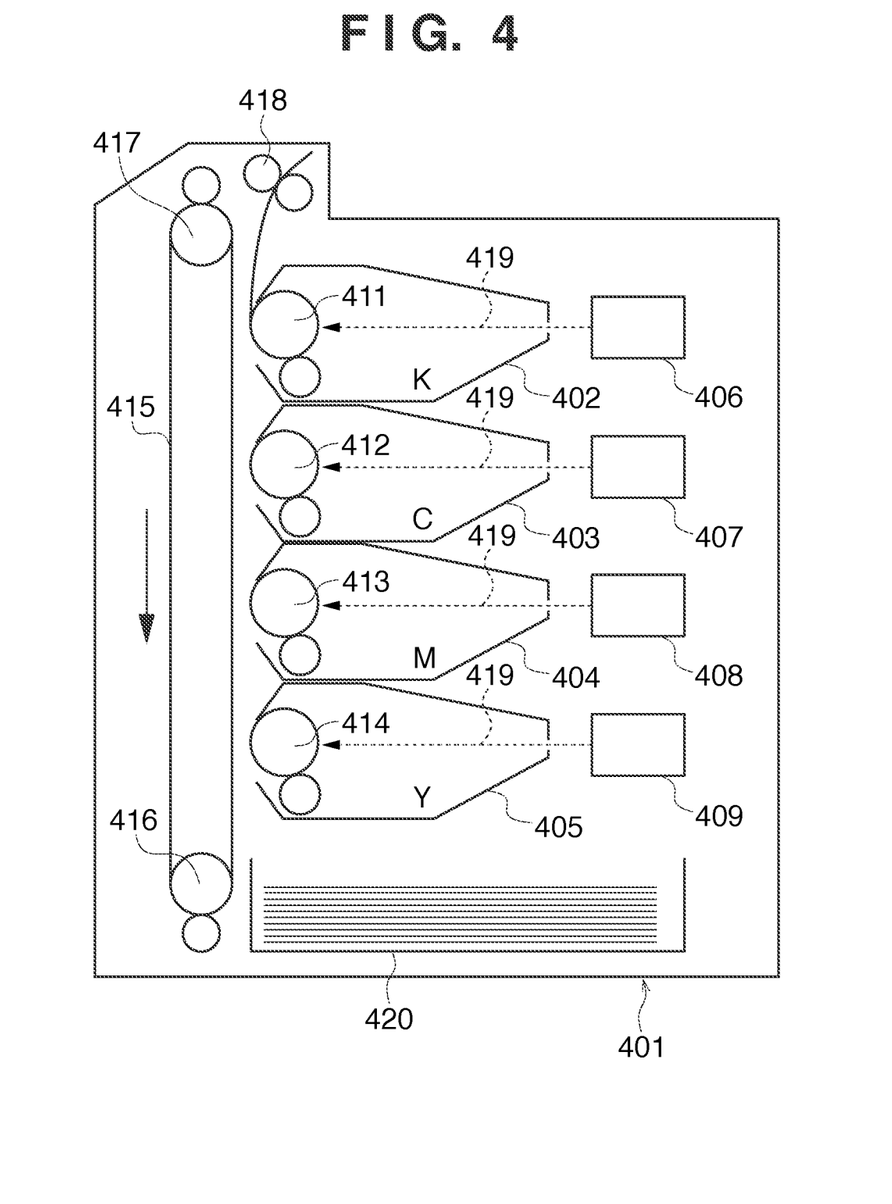
FIG. 4 is a typical diagram of a printer unit of the MFP according to the embodiment.

FIG. 4 is a typical diagram of a printer unit of the MFP according to the present embodiment.

The printer unit 401 according to the present embodiment adopts an electrophotographic method. The printer unit 401 employs tetra-tandem photosensitive drums each of which is provided for each color, and is capable of various color printing with basic colors including (from the bottom of the drawing) yellow (Y), magenta (M), cyan (C), and black (K), as well as combination of these colors. Numerals 402 to 405 denote respectively, black, cyan, magenta, and yellow toner cartridges. The toner cartridges 402 to 405 respectively incorporate photosensitive drums 411 to 414 which will be described later, toner containers (not shown) and disposal toner containers, and are removable from the main unit. Numerals 406 to 409 denote laser light generators. Image signals corresponding to respective colors are supplied to these laser generators 406 to 409, where the output intensities of laser diodes (not shown) which are respectively located inside are modified. As a result, the image signals are converted to strong or weak laser beams generated by the laser diodes. The laser beams respectively scan the photosensitive drums 411 to 414 as indicated by the dotted lines 419 using optical systems, each of which includes a scanning mirror, f-θ lens (not shown) and the like. Each of the photosensitive drums 411 to 414 is rotated by a rotation mechanism (not shown). The scanned laser beams form a latent image on each of the photosensitive drums. By attaching toner to the electrostatic latent image, image development is performed on each of he photosensitive drums and an image of each color is formed. A conveyance belt 415 is moved by rotation of rollers 416 and 417. When a paper sheet is supplied from a paper feed cassette 420 to the conveyance belt 415, the paper sheet is conveyed along with the movement of the conveyance belt to the positions of photosensitive drums 411 to 414 of respective colors. At each photosensitive drum, the toner image attached to the photosensitive drum is transferred to the paper sheet, and a color image is formed by toner images of four colors. When the paper sheet reaches the uppermost part, the toner on the paper sheet is fixed by a fixing unit (not shown). A paper discharge roller 418 discharges the printed paper sheet, which has reached the upper end, outside the printer unit.

Figure 5:
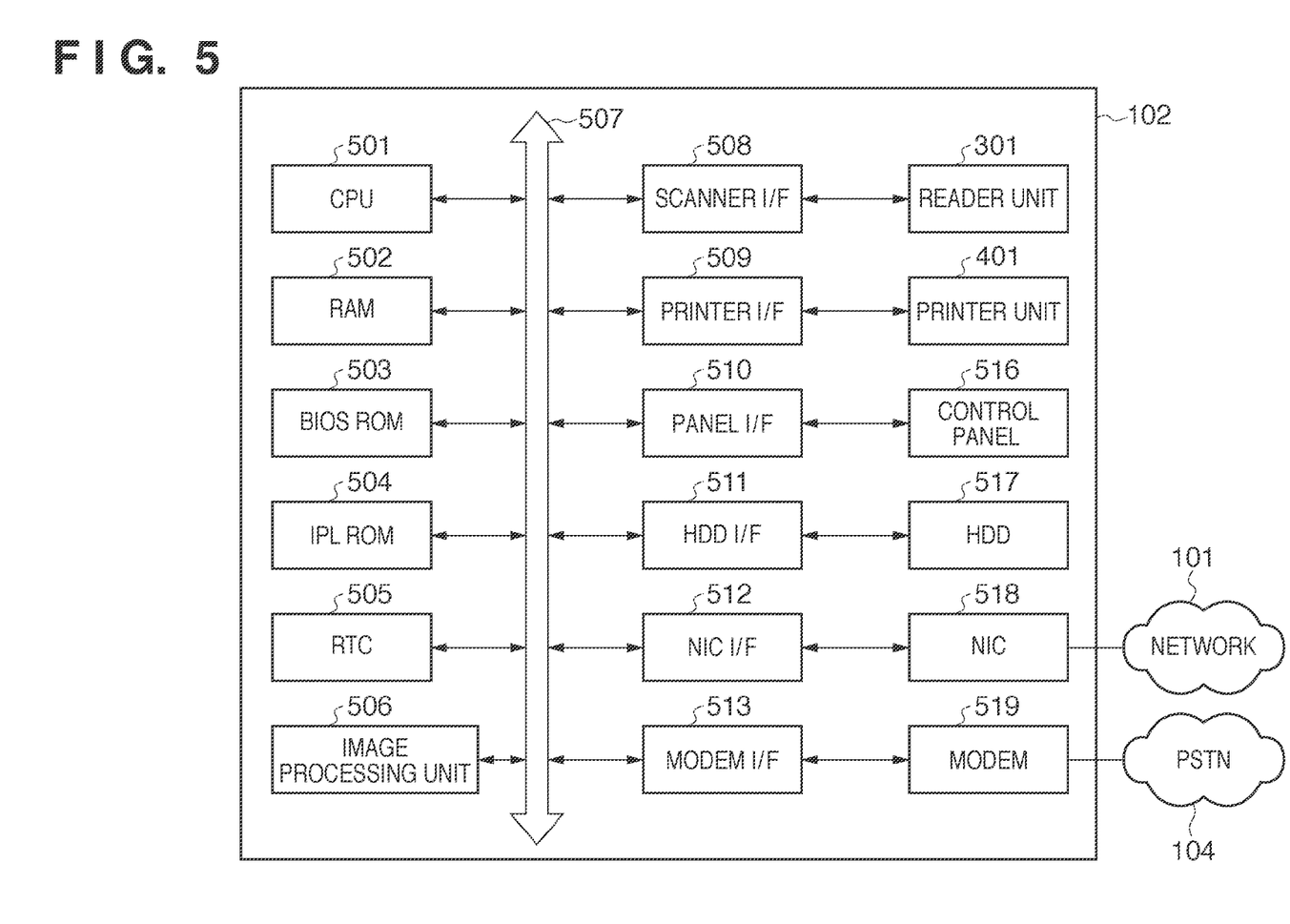
FIG. 5 is a block diagram describing a configuration of the MFP according to the embodiment.

FIG. 5 is a block diagram describing a configuration of the MFP 102 according to the present embodiment.

A CPU 501 performs overall control of accesses from various devices which are connected to a system bus 507, based on a program stored in a BIOS ROM 503 and a control program in a RAM 502 loaded from an HDD 517. The RAM 502 serves as a main memory and working area of the CPU 501. The memory capacity of the RAM 502 can be expanded by an optional RAM connected to an expansion port (not shown). Note that the RAM 502 is used as a developing area of image data inputted from the reader unit 301, a developing area of output data for printer operation, and a storage area of environment data. By the above-described control, the MFP 102 outputs an image signal as output data to the printer unit 401 which is connected to the MFP 102 through the printer interface 509. The BIOS ROM 503 mainly stores a control program for performing input/output basic controls, I/O initialization and so on. An IPL ROM 504 reads a program out of the HDD 517 to the RAM 502, and the control is shifted to the program. The IPL ROM 504 also performs reading snapshot data out of a storage medium into the RAM 502 at the time of return from hibernation according to the present embodiment. A Real Time Clock (RTC) 505 times and stores the time. A scanner interface 508 receives image data from the reader unit 301, or intermediates control command transmission and reception to or from the reader unit 301. The HDD 517 stores a program executed by the CPU 501, image data from the reader unit 301, print data from the PC 103, various control data, data files and the like. The data file is configured in a way that it is readable by other PCs and MFPs by virtue of the CPU 501 and the program installed in the HDD 517. A HDD interface 511 controls data writing and reading for the HDD 517.

The CPU 501 controls a Network Interface Card (NIC) 518 using a NIC interface 512. An output signal from the NIC interface 512 is transmitted to the network 101 through the NIC 518 so that the MFP 102 can communicate with other MFPs, printers, and host computers (PC). The NIC 518 has a physical layer for connection with the network 101 and a function for processing a low-level communication protocol. Furthermore, the NIC 518 may be so configured to have an NVRAM (not shown) for storing printer mode setting information from a control panel 516 through a panel I/F 510. A MODEM I/F 513 connects the MFP 102 with the PSTN 104 through a FAX MODEM 519. An image processing unit 506 performs image processing on inputted image data, such as image data from the reader unit 301, PDL print data, FAX reception data and the like, and stores the data in the RAM 502. The image processing unit 506 further performs image processing for generating image data to be transmitted to the printer unit 401 or for FAX transmission.

Figure 6:
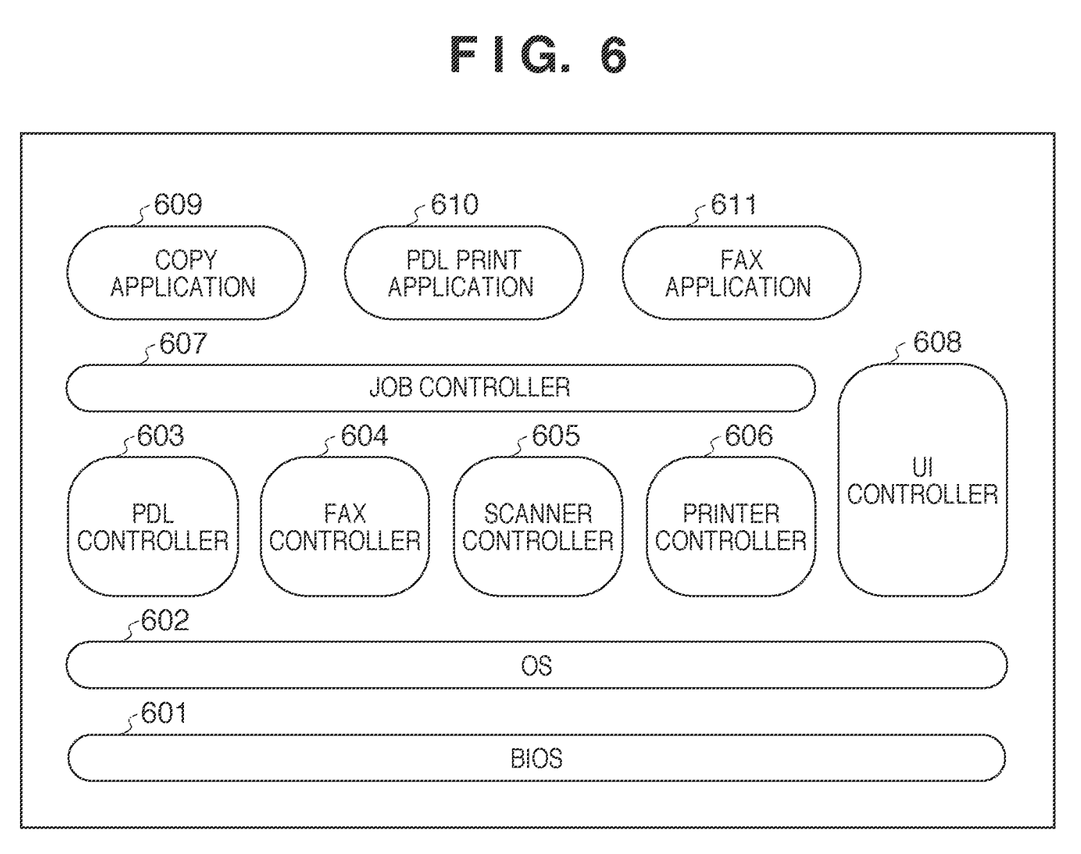
FIG. 6 is a block diagram describing a software configuration of the MFP according to the embodiment.

FIG. 6 is a block diagram describing a software configuration of the MFP 102 according to the present embodiment.

A BIOS 601 is stored in the BIOS ROM 503. The BIOS 601 is a control program for performing basic input/output control. The OS 602, which is stored in the HDD 517, is loaded to the RAM 502 upon start-up of the MFP 102 for controlling a read and execution of a control program. A PDL controller 603 controls PDL data reception from a PC (external apparatus) and development of the data. A FAX controller 604 controls FAX data transmission and reception between the MFP 102 and another FAX terminal (external terminal) through the PSTN 104. A scanner controller 605 controls the reader unit 301. A printer controller 606 controls the printer unit 401. A job controller 607 collectively controls the controllers 603 to 606 for controlling image forming jobs inputted by respective applications 609 to 611. A UI controller 608 displays a message to a user or receives user instructions through the control panel 516. A copy application 609 realizes a copy function with the use of the scanner controller 605 and the printer controller 606 through the job controller 607. A PDL print application 610 realizes a print (PDL print) function of PDL data (print data), received via the network 101, with the use of the PDL controller 603 and the printer controller 606 through the job controller 607. A FAX print application 611 realizes a FAX reception function and a received FAX data printing function with the use of the FAX controller 604 and the printer controller 606 through the job controller 607. The FAX print application 611 also realizes a FAX transmission function with the use of the scanner controller 605 and the FAX controller 604. These applications serve as job execution sections for executing respective jobs in cooperation with respective controllers.

Figure 7A:
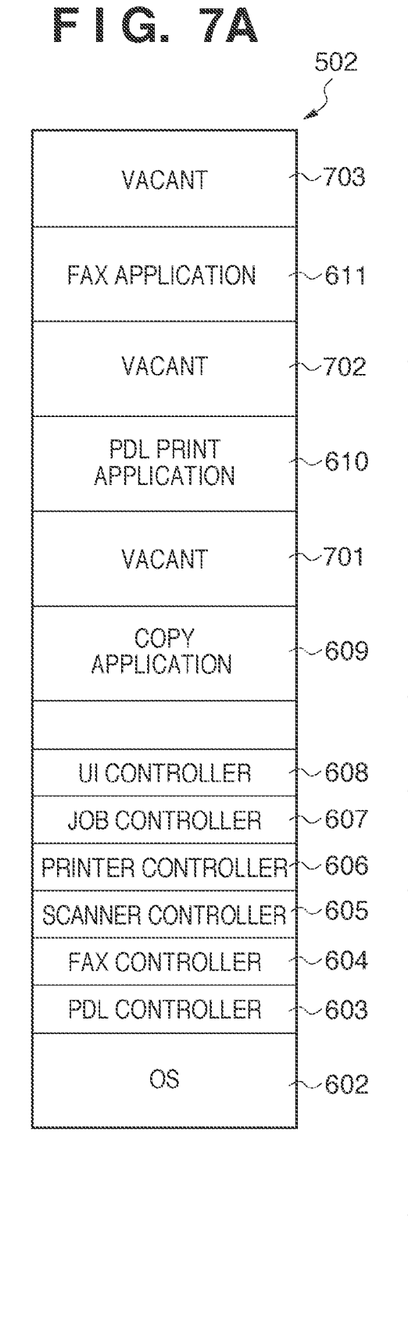
FIG. 7A is a diagram describing a program layout in a RAM.

FIG. 7A depicts a view describing an example of a layout of the programs in the RAM 502 which are explained in FIG. 6. Note that numerals 701 to 703 denote unused areas, and that program areas that the programs of FIG. 6 are stored are indicated by the same numerals as in FIG. 6.

Figure 7B:
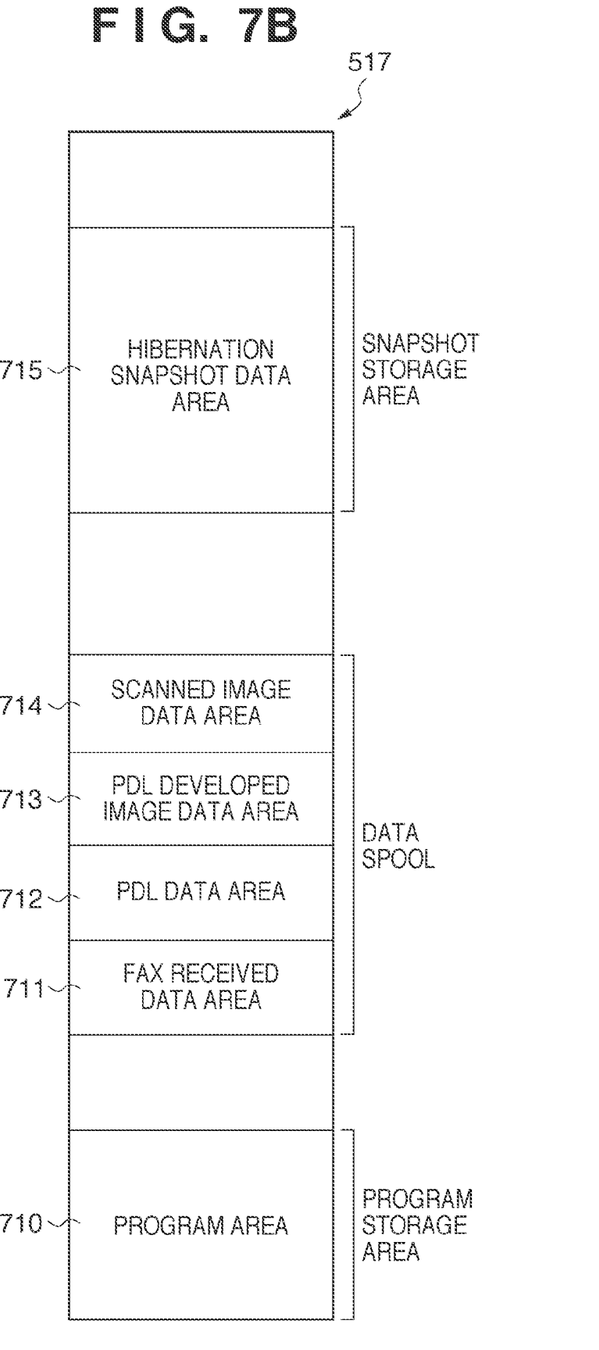
FIG. 7B is a typical diagram describing a data configuration of a HDD.

FIG. 7B depicts a view describing an example of a data configuration of the HDD 517.

An area 710 is where the programs are installed. An area 711 is where data received by FAX is stored. An area 712 is where received PDL data is stored. An area 713 is where developed image data of the received PDL data is stored. An area 714 is where image data read by the reader unit 301 is stored. An area 715 is a storage area of snapshot data which is a backup of periodically collected data.

Figure 8A:
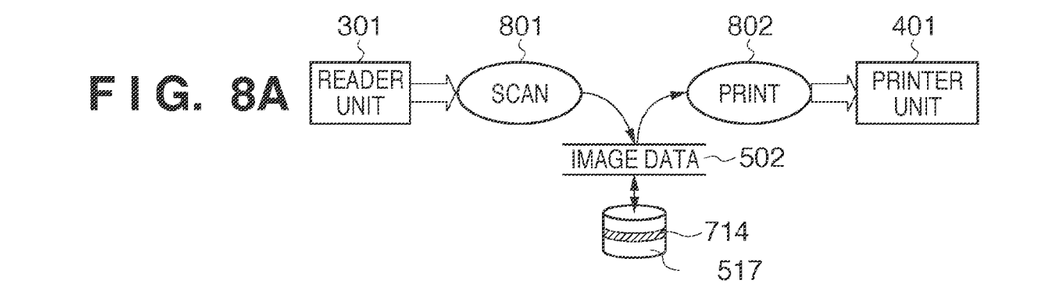
FIGS. 8A to 8C depicts explanatory views illustraing the processing of respective applications in the MFP.
Figure 8B:
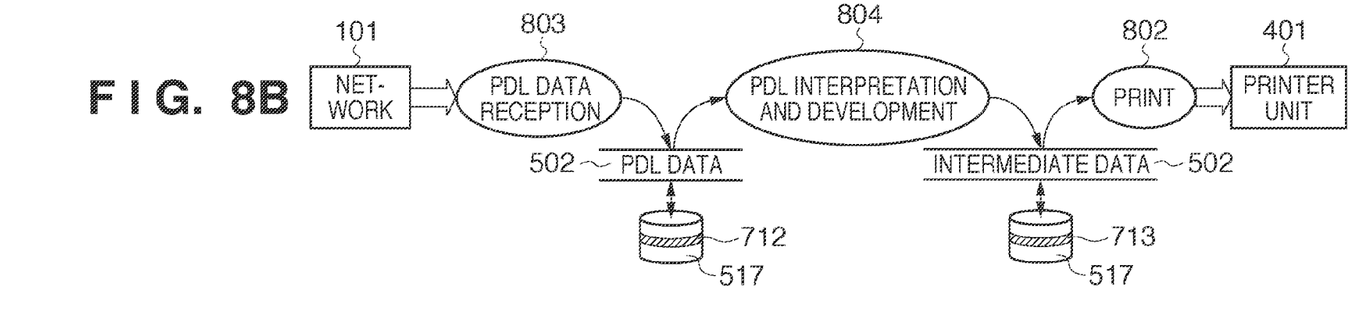
Figure 8C:
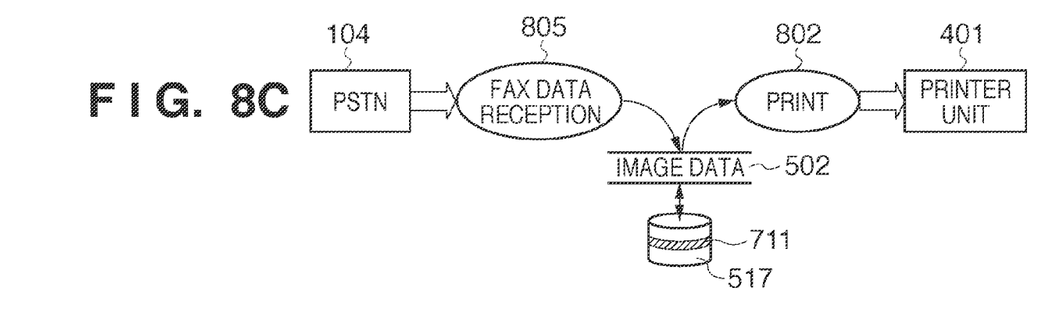

FIGS. 8A to 8C depict views illustrating the processing of respective applications, including copying, PDL printing, and FAX reception and printing by the MFP according to the present embodiment.

FIG. 8A shows an image data flow in copying. Image data read by the reader unit 301 is subjected to scan process 801 and stored in the RAM 502. When there are multiple original documents (pages), multiple items of image data corresponding to the number of the pages are respectively stored in the RAM 502. The multiple items of image data stored in the RAM 502 are sequentially stored in page unit in the scanned image data area 714 of the HDD 517. In print processing, the image data stored in the RAM 502 is transferred to the printer unit 401 through the print process 802 for image printing. If image data of a page which has not been loaded in the RAM 502 is held in the scanned image data area 714 in the HDD 517, the image data of the page is read out of the scanned image data area 714 to the RAM 502, and then transmitted to the print process 802. Further, in a case where plural (N) copies are to be printed, image data of the same page is read out of the scanned image data area 714 to the RAM 502 N times, and the same image data is printed N times. In other words, the RAM 502 or the HDD 517 serves as a spool point of the data flow.

FIG. 8B shows an image data flow in PDL printing. In PDL data reception process 803, PDL data is received from the network 101 and stored in the RAM 502. Further, the PDL data stored in the RAM 502 is stored in the PDL data area 712 of the HDD 517. In PDL interpretation and development process 804, the PDL data in the RAM 502 is interpreted and developed, and the image data is written in the RAM 502. The data stored in the RAM 502 in this manner is stored in the PDL developed image data area 713 of the HDD 517. If PDL data has not been loaded in the RAM 502 in this stage, the PDL data is loaded from the PDL data area 712. For image printing, the image data developed in the RAM 502 is transmitted to the printer unit 401 through the print process 802.

FIG. 8C shows an image data flow in FAX reception and printing. In FAX data reception process 805, FAX data is received from the PSTN 104, stored in the RAM 502, and then stored in the FAX received data area 711 of the HDD 517. For image printing, the FAX received image data stored in the RAM 502 is transmitted to the printer unit 401 through the print process 802, and the FAX-received image is printed.

Next, a hibernation process according to the present embodiment is described with reference to the flowcharts in FIGS. 9 to 13. In the hibernation transition process which will be described later, a copy job is cancelled. In a PDL print job, a subsequent job input is prohibited, and the job is suspended when all PDL data corresponding to one job is stored in the PDL data area 712. In a FAX reception and printing job, a subsequent job input is prohibited as similar to the PDL print job, and the job is suspended when all FAX reception data corresponding to one job is stored in the FAX received data area 711 of the HDD 517, thereafter, hibernation entering operation is performed.

Figure 9:
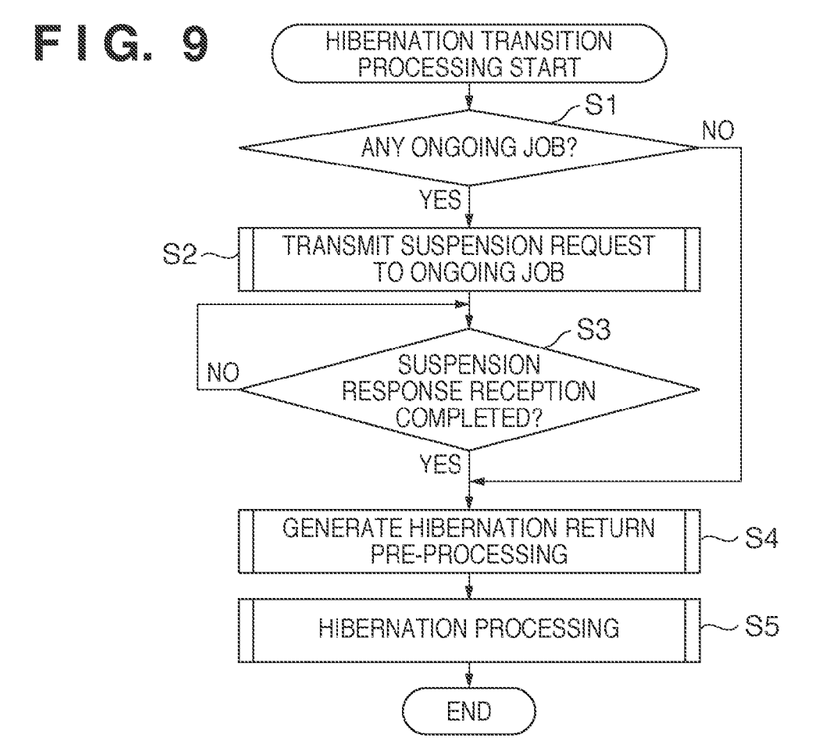
FIG. 9 is a flowchart describing an outline of hibernation transition processing.

FIG. 9 is a flowchart describing a summary of hibernation control for a hibernation transition, which is performed by the job controller 607 according to the present embodiment. This process is achieved by executing a program loaded in the RAM 502 by the CPU 501.

An trigger to start the hibernation transition process includes: an instruction based on a user operation using a UI or power switch, an instruction to start a hibernation transition based on a power-saving timer, or the like. However, the present invention is not limited to them. Assume herein that the process shown in FIG. 9 is started by a hibernation transition instruction. In step S1, it is determined whether or not there is an ongoing job, for example, copying, PDL printing, or faxing. If it is determined that there is an ongoing job, the processing proceeds to step S2; otherwise, the processing proceeds to step S4. In step S2, a job suspension request is issued to instruct the ongoing job to enter a job suspension process for hibernation. When the job suspension request is issued, the processing proceeds to step S3. In step S3, responses to all the job suspension requests transmitted to each of the ongoing jobs are awaited. When responses are received from all the ongoing jobs, the processing proceeds from step S3 to step S4. In step S4, a pre-processing sequence to be executed at the time of return from hibernation is generated in the RAM 502 for generating a processing sequence for initializing the hardware that cannot be initialized by a BIOS program and releasing the job suspension state that has been caused by the job suspension request in step S2. In step S5, a snapshot image of hibernation, for instance, data in the RAM 502, is stored in the snapshot data storage area 715 of the HDD 517. When this process ends, the hibernation transition process is completed.

Figure 10:
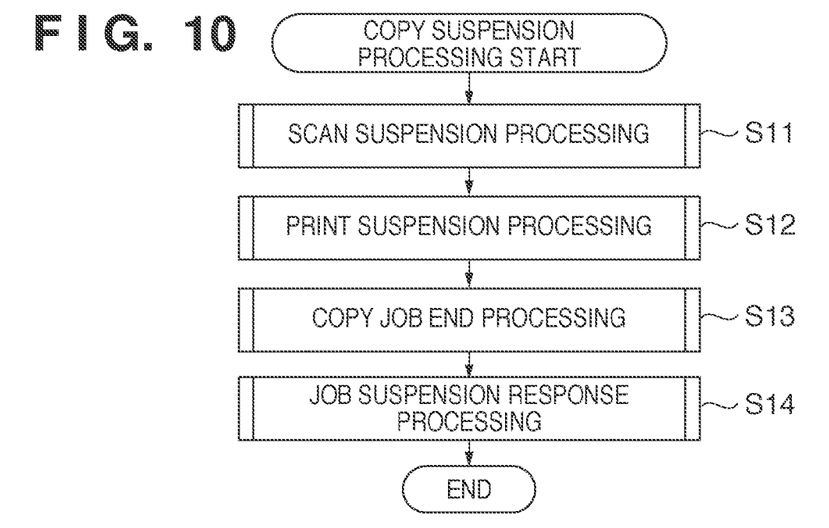
FIG. 10 is a flowchart describing copy suspension processing.
Figure 11:
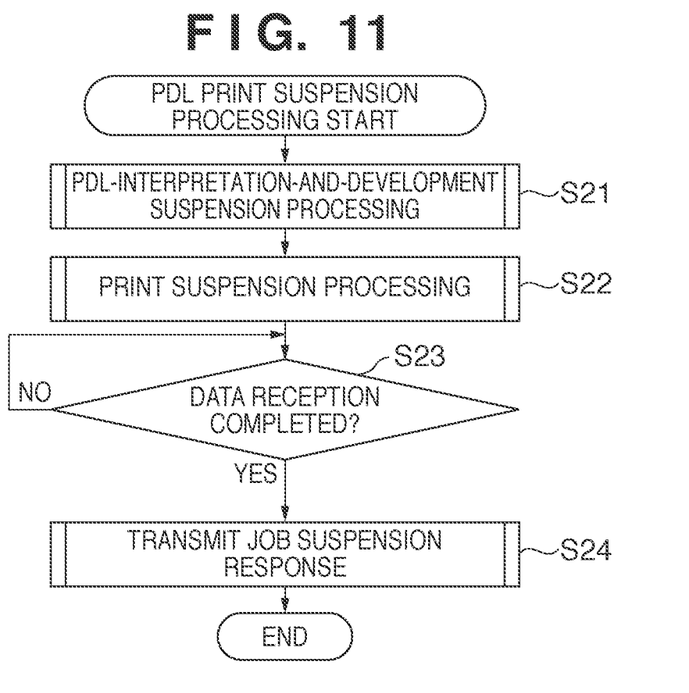
FIG. 11 is a flowchart describing PDL-print-job suspension processing.
Figure 12:
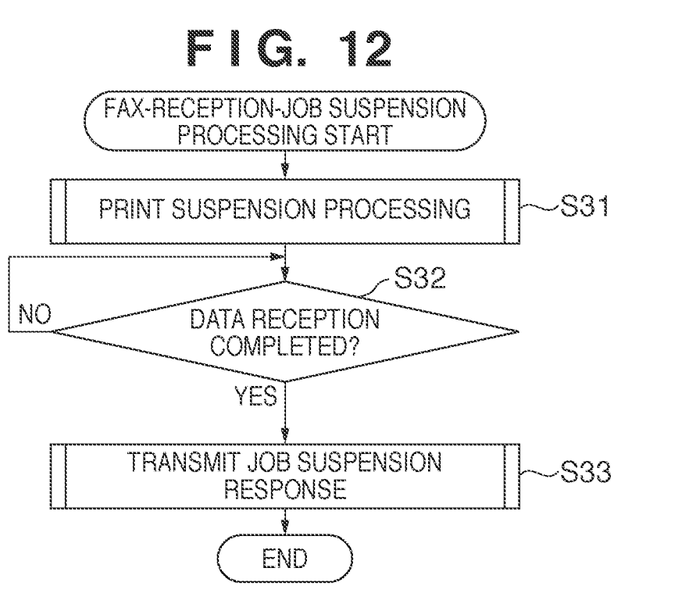
FIG. 12 is a flowchart describing FAX-reception-job suspension processing.

Described next, with reference to FIGS. 10 to 12, is the job suspension process of respective jobs, which is started by receiving a job suspension request transmitted in S2 in FIG. 9. Note that the program which runs these processes is loaded from the HDD 517 to the RAM 502 and executed under the control of the CPU 501.

FIG. 10 is a flowchart describing a copy suspension process executed by the copy application 609.

This process starts when a copy job receives a job suspension request. First, in step S11 scan processing is suspended. If the scan has been completed for all original documents, the process immediately ends without any particular processing. If the scan has not been completed for all original documents, document reading process is suspended. If the scan is being performed by feeding and reading the original documents from a document feeder, all the fed documents are discharged and the scan is suspended. In step S12, print suspension process for suspending print processing is executed. If printing for all pages of the job has been completed, the process immediately ends without any particular processing. If the printing is not completed for all pages, printing of the current page is performed and thereafter printing of the subsequent pages is suspended. In step S13, a copy job termination procedure is executed, and the copy job is terminated. In step S14, a job suspension response is returned for the received job suspension request. When a job suspension response is transmitted in this manner, the copy job suspension process ends.

The foregoing description regarding a copy job according to the present embodiment is provided on an example of an operation specification, where the job is canceled by the suspension process at the time of a hibernation transition, and the scan or print processing at the point of suspension is not resumed after return from the hibernation. However, the present invention is not limited to this example, and may adopt an operation specification where the copy job is not canceled, and the remaining scan or print operation is resumed after return from the hibernation.

FIG. 11 is a flowchart describing PDL-print-job suspension by the PDL controller 603.

The processing starts when a job suspension request is received. In step S21, PDL data interpretation and development are suspended. If there is a page being processed for interpretation and development, processing on the page is completed, and processing of the subsequent pages is suspended. Next in step S22, print processing is suspended as similar to step S12. In step S23, completion of the PDL data reception of the job is awaited. Completion of data reception for one job is determined by, for instance, an end code indicative of a job end in the PDL or a command from the printer driver. When it is determined that data for one job has been received and the PDL data for one job has been stored in the PDL data area 712, the processing proceeds to step S24. In step S24, a job suspension response is transmitted as similar to step S14. Then, the PDL print suspension processing ends. Note that, in the PDL print job, since the remaining interpretation, development, and print processing are resumed after return from hibernation, job end processing is not performed as in step S13 of the copy job, but the job itself is restored after return from hibernation.

FIG. 12 is a flowchart describing FAX-reception-job suspension processing by the FAX controller 604. The processing starts when a FAX reception job receives a job suspension request. In step S31, print processing is suspended as similar to steps S12 and S22. Next in step S32, completion of FAX data reception is awaited. Completion of FAX data reception is determined by completion of a cutting procedure (EOP reception, MCF transmission, DCN reception) according to, for example, ITU-TT.30 protocol (not shown). When it is determined that data reception has been completed, the FAX reception image data for one job, which has been received so far, is stored in the FAX received data area 711 of the HDD 517. In step S33, a job suspension response is transmitted as similar to steps S14 and S24. Then, the FAX-reception-job suspension processing ends. As in the PDL print job, the state of the FAX reception print job is stored at the time of suspension for hibernation, and the remaining print processing can be resumed after return from hibernation.

Figure 13:
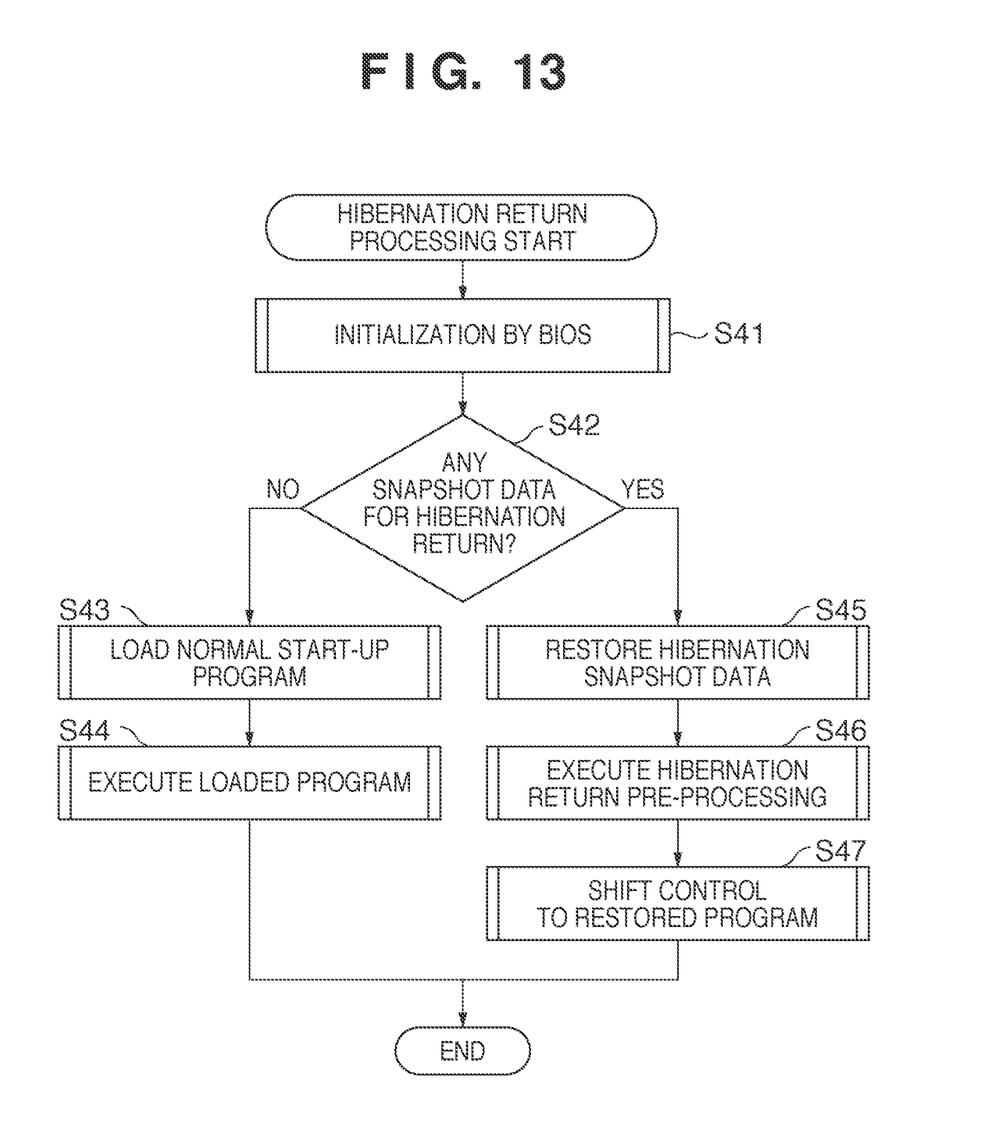
FIG. 13 is a flowchart describing an operation for returning from hibernation.

FIG. 13 is a flowchart describing an operation for returning from hibernation, performed by the job controller 607.

Hibernation return operation is started when a prescribed event, such as power-on operation, reset operation and the like, occurs. In step S41, initialization is executed by a program stored in the BIOS ROM 503. The subsequent steps step S42 to S45 are performed by the program stored in the IPL ROM 504. In step S42, it is determined whether or not snapshot data for hibernation return is stored in the snapshot data storage area 715 of the HDD 517. If so, the processing proceeds to step S45; if not, the processing proceeds to step S43. In step S45, an IPL program restores the snapshot data for hibernation return in the RAM 502. In step S46, the preprocessing sequence to be executed at the time of hibernation return, which has been generated in step S4 of FIG. 9, is executed. Herein, the hardware which cannot be initialized by the BIOS program is initialized, and the suspension state of the job which was suspended in the hibernation transition is released. As a result, the state of the hardware and job is restored, providing an environment for resuming the suspended job. In step S47, the control is shifted to the restored program. As a result, the state immediately before the suspension for hibernation is regained, and the job processing is resumed.

Meanwhile, if it is determined in step S42 that snapshot data for hibernation return is not stored, the processing proceeds to step S43 where a program for normal start-up of the IPL program is loaded. In step S44, the control is shifted to the loaded program for execution. In this manner, hibernation return processing ends.

As has been described above, according to the present embodiment, it is possible to reduce time period required for a transition to hibernation, and resume a suspended job after return from hibernation without losing the job.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (foe example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-186777, filed Aug. 11, 2009, which is hereby incorporated by reference herein in its entirety.

What is claimed is:

1. An image forming apparatus having a first mode and a second mode, wherein power consumption of the second mode is lower than power consumption of the first mode, comprising:
   an acquiring unit configured to acquire an instruction to transit the image forming apparatus from the first mode to the second mode;
   a determination unit configured to determine, after the acquiring unit acquired the instruction, whether or not a print job is being executed, the print job corresponding to interpretation and development process of print data;
   a control unit configured to, in a case where the acquiring unit acquired the instruction while the print job was being executed and it is determined by the determination unit that the print job is being executed after the acquiring unit acquired the instruction, suspend execution of the print job and transit, after the execution of the print job has been suspended, the image forming apparatus from the first mode to the second mode; and
   a resuming unit configured to, in a case where a transition to the first mode is instructed in the second mode, resume the print job which is suspended by the control unit.

2. A method of controlling an image forming apparatus having a first mode and a second mode, wherein power consumption of the second mode is lower than power consumption of the first mode, comprising:
   an acquiring step of acquiring an instruction to transit the image forming apparatus from the first mode to the second mode;
   a determination step of determining, after the acquiring step acquired the instruction, whether or not a print job is being executed, the print job corresponding to interpretation and development process of print data;
   a control step of, in a case where the acquiring step acquired the instruction while the print job was being executed and it is determined in the determination step that the print job is being executed after the acquiring step acquired the instruction, suspending execution of the print job and transiting, after the execution of the print job has been suspended, the image forming apparatus from the first mode to the second mode; and
   a resuming step of, in a case where a transition to the first mode is instructed in the second mode, resuming the print job which is suspended in the control step.

3. The image forming apparatus according to claim 1, wherein, in a case that an ongoing job does not exist when the acquiring unit acquires the instruction, the control unit immediately transits the image forming apparatus from the first mode to the second mode.

4. The image forming apparatus according to claim 1, wherein the print job is a PDL print job or a FAX reception and print of the received FAX.

5. The image forming apparatus according to claim 1, wherein the second mode is hibernation mode where a state of the image forming apparatus before power-off is stored in a hard disk of the image forming apparatus and the stored state of the image forming apparatus is restored in a random access memory of the image forming apparatus at a next power-on timing of the image forming apparatus.

6. The image forming apparatus according to claim 1, wherein the control unit transits the image forming apparatus from the first mode to the second mode after reception of the print job has been completed, in a case where the print job is being received from an external apparatus when the acquiring unit acquires the instruction.

7. The image forming apparatus according to claim 1, wherein the control unit is configured to suspend, in a case where the acquiring unit acquires the instruction while the interpretation and development process is being executed, the execution of the interpretation and development process on half way of the process, and
 the resuming unit configured to resume, in a case where a transition to the first mode is instructed in the second mode, the interpretation and development process from a point at which the interpretation and development process is suspended.

8. The image forming apparatus according to claim 1, further comprising a second determination unit configured to determine, in a case where the acquiring unit acquires the instruction, to transit the image forming apparatus from the first mode to the second mode, and
 the control unit configured to suspend, in a case where the at least one job is being executed and is not suspended after the second determination unit determines to transit the image forming apparatus from the first mode to the second mode, execution of the at least one job.

9. The image forming apparatus according to claim 1, wherein the control unit is configured to determine, according to a type of job, a way of suspension of a job being executed after the acquiring unit acquired the instruction.

10. The image forming apparatus according to claim 1, wherein, in a case where a copy job and the print job are being executed after the acquiring unit acquired the instruction, the control unit cancels the execution of the copy job and suspends the execution of the print job, and
 the resuming unit is configured to resume, in a case where a transition to the first mode is instructed in the second mode, the print job which is suspended by the control unit.

11. The image forming apparatus according to claim 1, wherein, in a case where a FAX reception from an external device and a print job of the received FAX are being executed after the acquiring unit acquired the instruction, the control unit does not suspend the execution of the FAX reception until the FAX reception is completed.

* * * * *